(12) United States Patent
Jungnickel

(10) Patent No.: US 6,997,465 B2
(45) Date of Patent: Feb. 14, 2006

(54) SLIDING APPARATUS ON SNOW

(75) Inventor: Nils-Peter Ken Jungnickel, Stuttgart (DE)

(73) Assignee: Jykk GmbH, (DE)

( * ) Notice: Subject to any disclaimer, the term of this patent is extended or adjusted under 35 U.S.C. 154(b) by 152 days.

(21) Appl. No.: 10/466,840

(22) PCT Filed: Jan. 21, 2002

(86) PCT No.: PCT/EP02/00558

§ 371 (c)(1),
(2), (4) Date: Sep. 9, 2003

(87) PCT Pub. No.: WO02/070321

PCT Pub. Date: Sep. 12, 2002

(65) Prior Publication Data

US 2004/0075227 A1    Apr. 22, 2004

(30) Foreign Application Priority Data

Jan. 19, 2001   (DE) ............................... 101 02 340

(51) Int. Cl.
*B62B 13/00*   (2006.01)
(52) U.S. Cl. .................................................. 280/14.27
(58) Field of Classification Search ............ 280/14.21, 280/14.27, 14.28, 18, 21.1, 22.1, 28, 28.14
See application file for complete search history.

(56) References Cited

U.S. PATENT DOCUMENTS

| | | | | |
|---|---|---|---|---|
| 1,445,219 A | * | 2/1923 | Larson ........................ | 280/7.12 |
| 1,672,782 A |   | 6/1928 | Ring | |
| 2,062,953 A | * | 12/1936 | Wargo ...................... | 280/28.14 |
| 3,228,045 A | * | 1/1966 | Shepherd et al. ............. | 441/98 |
| 3,529,847 A | * | 9/1970 | Shores ..................... | 280/14.22 |
| 4,129,313 A | * | 12/1978 | Benson ..................... | 280/14.27 |
| 6,036,202 A | * | 3/2000 | LaCome .................. | 280/28.14 |
| 6,139,031 A | * | 10/2000 | Wingard .................. | 280/14.28 |

FOREIGN PATENT DOCUMENTS

| | | | |
|---|---|---|---|
| CH | 569492 | * | 11/1975 |
| FR | 2657787 | * | 8/1991 |
| WO | WO 99/29377 | | 6/1999 |

* cited by examiner

*Primary Examiner*—Frank Vanaman
(74) *Attorney, Agent, or Firm*—DLA Piper Rudnick Gray Cary US LLP

(57) ABSTRACT

A sliding apparatus on snow comprising: a sliding plate in the shape of a snow board, a front stay having a lower end attached to a front portion of the sliding plate pivotably only in a front and rear direction and which extends in a skewed rear upper direction therefrom, a handlebar at an upper end of the front stay, a frame stay having a front end pivotably attached at a middle portion of the front stay and which extends in a bifurcated shape rearward and downward in a central position over the sliding plate, wherein at each of end of the frame stay having the bifurcated shape, a frame extension portion is connected, each frame extension portion extending along edges of the sliding plate and fixed thereto, a feet supporting plate between the two frame extension portions, a supporting stay having front end pivotably attached to an upper portion of the front stay and which extends rearwardly and downwardly, and a rear end attached pivotably to the feet supporting plate, a feet holding belt attached to the frame extension portions or to the feet supporting plate, and suspension members provided in an axis of the front stay, the frame stay, and the supporting stay to absorb forces which occur in an axial direction on the stays during bending of the sliding plate.

3 Claims, 1 Drawing Sheet

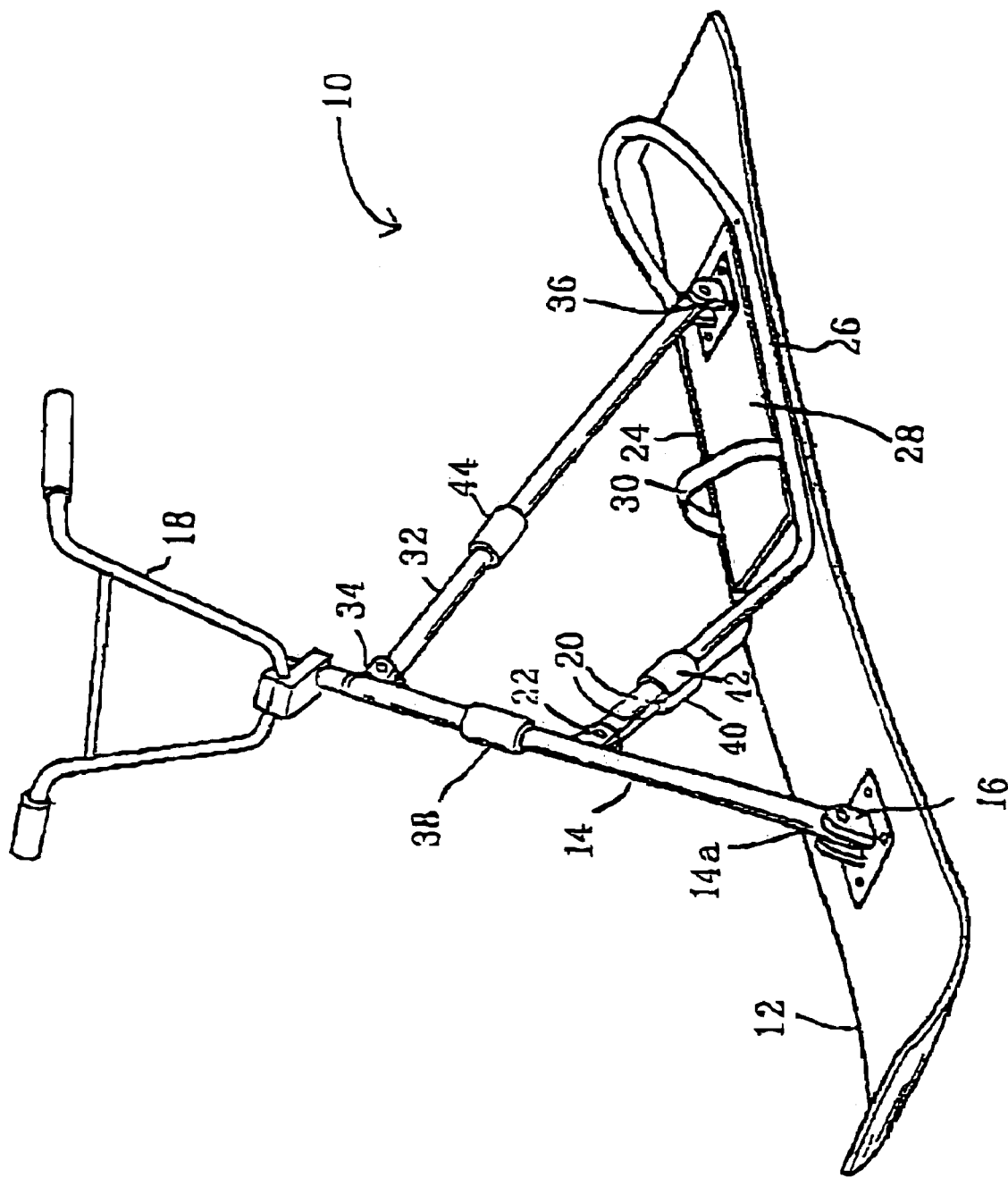

US 6,997,465 B2

SLIDING APPARATUS ON SNOW

CROSS-REFERENCE TO RELATED APPLICATION

This application is a 371 based on European International Application No. PCT/EP02/00558 filed Jan. 21, 2002 of German Patent Application No. 101 02 340.5, filed Jan. 19, 2001, the priority of which is hereby claimed.

FIELD OF THE INVENTION

This invention relates to a sliding apparatus on snow.

BACKGROUND

The present invention relates to a sliding apparatus on snow.

As a representative sliding apparatus on snow, there is known a snow board. However, following two difficulties are accompanied in operating the snow board.
1) A snowboard rider slides in a transverse direction while keeping balance in a posture directed in the transverse direction, which is not natural in view of human anatomy and operation thereof is difficult.
2) Although the lower half of the body of the rider is fixed to the instrument, the upper half of the body is in a free state and the balance is difficult to keep.

As other sliding apparatus on snow, there is becoming known a so-to-speak ski bob disclosed in U.S. Pat. No. 5,351,975. Such a skibob is provided with a structure having a front steering sliding plate and a rear supporting sliding plate, having a support plate for mounting to align both feet of the user above the rear supporting sliding plate and attached with a handle at the front steering sliding plate.

According to the snow bicycle, a rider slides in the front direction while being directed to the front direction and accordingly, the snow bicycle is more excellent in view of the human anatomy than the snow board, further, since the handle is provided, the upper half body can be restricted to some degree and therefore, there is achieved an advantage that maneuverability is comparatively excellent.

However, according to the skibob, substantially over the entire length of the supporting sliding plate which needs bending thereof, a frame extension portion constituting an extension portion of a rigid frame is fixed and therefore, the maneuverability inherently provided to the sliding plate is not used to full effect, That is, according to the above-described skibob, there are following four drawbacks.
1) The direction cannot be changed by operating the handle. Instead, the direction is changed by edging (physical weight movement). A rider is rather liable to depend on the presence of the handle and the operation is troublesome.
2) By being divided in two parts, the effective edge length is extremely shorter than that of a ski or a snow board because the length of about 160 cm from the front end portion of the front plate to a rear end portion of a rear plate and an adverse influence is effected on operation of the device.
3) The front plate is short and full of the feature of "bending" inherently provided to the plate is not made.
4) In the case of the current structure, when the handle is turned to the left, the frame falls to the left and when the handle is turned to the right, the frame falls to the right. In that case, a sliding turn must be carried out while turning "the handle reversely" in sliding. That is, a turn must always be made while decelerating.

Hence, it would be advantageous to provide a novel sliding apparatus on snow excellent in maneuverability in view of human anatomy and capable of making full use of feature of a sliding plate per se excellently.

SUMMARY OF THE INVENTION

A sliding apparatus on snow comprising: a sliding plate in the shape of a snow board, a front stay having a lower end attached to a front portion of the sliding plate pivotably only in a front and rear direction and which extends in a skewed rear upper direction therefrom, a handlebar at an upper end of the front stay, a frame stay having a front end pivotably attached at a middle portion of the front stay and which extends in a bifurcated shape rearward and downward in a central position over the sliding plate, wherein at each of end of the frame stay having the bifurcated shape, a frame extension portion is connected, each frame extension portion extending along edges of the sliding plate and fixed thereto, a feet supporting plate between the two frame extension portions, a supporting stay having front end pivotably attached to an upper portion of the front stay and which extends rearwardly and downwardly, and a rear end attached pivotably to the feet supporting plate, a feet holding belt attached to the frame extension portions or to the feet supporting plate, and suspension members provided in an axis of the front stay, the frame stay, and the supporting stay to absorb forces which occur in an axial direction on the stays during bending of the sliding plate.

BRIEF DESCRIPTION OF THE DRAWING

The drawing is a schematic perspective view of a sliding apparatus in accordance with aspects of the invention.

DETAILED DESCRIPTION

This invention includes a sliding apparatus on snow comprising:
a sliding plate in a shape of a snow board:
a front stay a lower end of which is attached to a front portion of the sliding plate pivotably only in a front and rear direction and which extends in a skewed rear upper direction therefrom:
a handle fixed to an upper end of the front stay;
a rigid frame a front end of which is pivotably attached to a middle portion of the front stay and which is extended therefrom toward a rear side thereof while being divided in a bifurcated shape and extended to a lower side thereof from a central position above the sliding plate in the front and rear direction to a rear side thereof;
two pieces of frame extension portions continuous to the rigid frame in the bifurcated shape, extended to a rear side thereof along side edges of the sliding plate and fixedly attached to the sliding plate;
a feet supporting plate arranged between the frame extension portions;
a rear stay a front end of which is pivotably attached to an upper portion of the front stay, which is extended there from in a rear lower direction and a rear end of which is attached pivotably to the feet supporting plate;
a feet holding belt attached to the frame extension portions or the feet supporting plate; and
suspensions provided at the front stay, the rigid frame and the rear stay.

A detailed explanation will be given of a structure of a sliding apparatus on snow according to an embodiment of the invention as follows, with reference to the drawing, which shows a perspective view with the representation of a sliding apparatus on snow according to an embodiment of the invention. The number 10 designates a sliding apparatus on snow, 12 a sliding plate, 14 a front stay, 16 a hinge, 18 a handle, 20 a rigid frame, 22 a hinge, 24 a frame extension portion, 26 a frame extension portion, 28 a feet supporting plate, 30 a feet holding strap, 32 a rear stay, 34 a hinge, 36 a hinge, 38 a suspension, 40 a suspension, 42 a suspension and 44 a suspension.

A sliding apparatus 10 according to the invention is provided with a sliding plate 12 in the shape of a snow board. As the sliding plate 12, there can be used an existing snow board provided with holes for attaching a frame and the like, which is described below. As a snow board, any snow board for downhill, alpine and free style can be used.

At a front portion of the sliding plate 12, a front stay 14 is attached at a lower end 14a thereof by a hinge 14 pivotable only in the front and rear direction of the sliding plate 12. The front stay 14 is extended in a skewed or inclined upper rear direction by a predetermined length from the lower end 14a in consideration of the physical size of the rider. An angle made by the above-described front stay 14 and the sliding plate 12 is preferably 60 through 80 degrees, particularly, about 65 through 75 degrees.

At an upper end of the front stay 14 there is fixed a handle 18 in a shape as illustrated.

At a middle portion of the front stay 14 there is attached a rigid frame 20 by a hinge 22 pivotably in an up and down direction. The rigid frame 20 extends in a skewed or inclined direction from a central position in the front and rear direction above the sliding plate 12 to a rear side thereof while being divided in a bifurcated shape from a front end 20a to the rear side. The rigid frame in the bifurcated shape is integrally provided with frame extension portions 24 and 26 continuous thereto. The frame extension portions 24 and 26 are extended to the lower side along side edges of the sliding plate 12 and are fixed to the sliding plate 12 by screws.

There is provided feet supporting plate 28 on which the rider's feet mount between the frame extension portions 24 and 26. It is preferable that a main body of the feet supporting plate 28 is constituted of a rigid rectangular metal plate and is welded to side portions of the frame extension portions 24 and 26 substantially over entire lengths of two side portions thereof. Further, it is preferable that the feet supporting plate 28 is integrated with the sliding portion 12 by being fixed to the sliding plate 12 by screws at least at four locations at both sides of the front portion and rear portion thereof. It is preferable that the frame extension portions 24 and 26 and the feet supporting plate 28 are first welded and are afterwards fixed to the sliding plate 12 by screws. It is preferable that the feet supporting plate 28 is coated with rubber at an upper face thereof constituting a feet mounting surface for slippage prevention. Further, at a front portion of the feet supporting plate 28 (or frame extension portions 24, 26), there is attached a feet holding strap 30 in a shape of a belt of a sandal.

An upper portion of the front stay 14 is attached with a rear stay 32 at a front end thereof by a hinge 34 pivotably in the up and down direction. The rear stay 32 is extended in a skewed or inclined rear lower direction and a lower end thereof is attached to the sliding plate 12 or the feet supporting plate 28 on a rear side of the feet holding strap 12 by a hinge 36 pivotably in the up and down direction.

The rear side stay 32 is arranged between the two legs of the rider for ease of turning by applying the rider's physical weight on an edge on the inner side of a turn. In order to efficiently transmit force resulting from the rider's physical weight, it is preferable that the feet supporting plate 28 is fixed to the sliding plate 12 as firmly as possible.

There are provided suspension members 38, 40, 42 and 44 at middle portions of the front stay 14, the rigid frame 20 and the rear stay 32. The suspension members 38, 40, 42 and 44 function to absorb bending when the sliding plate 12 is bent in cooperation with the hinges 16, 22, 34 and 36. Thereby, according to the sliding apparatus on snow, during turning, the edges of the sliding plate 12 can be used to full effect and turning performance and maneuverability are significantly promoted. In contrast thereto, according to the above-described skibob, the sliding plate on the rear side is substantially a rigid member by attaching the frame or the feet supporting plate and as mentioned above, turning performance and maneuverability thereof are not so excellent.

The sliding plate 12 is constituted of a conventional snow board constituting material laminated with wood, metal, fiberglass or carbon fiber by synthetic resin. It is preferable that side edge portions of a lower face side of the sliding plate are reinforced by sharp metal rails or so-to-speak edge material to protect against friction with regard to a sliding face constituting ice and snow although a degree thereof differs and against static friction particularly in the case of turning.

Meanwhile, it is preferable to constitute the front stay 14, the rigid frame 20 (including frame extension portions 24, 26) and the rear stay 32 by metal pipes of, for example, an aluminium alloy.

In sliding on snow by the sliding apparatus explained above, a rider aligns and mounts both feet on the feet supporting plate and inserts then into the strap and slides while holding the handle. Thereby, the rider can slide while directing the body in the advancing direction with the forward posture. Further, by holding the handle, balance of the upper half of the body can easily be kept. Further, in addition to the above-described, by making effective use of the bending of the sliding plate, as described above, the turning performance of the snow board is maintained while ease of use of the so-to-speak snow bicycle is maintained.

What is claimed is:

1. A sliding apparatus on snow comprising:
   a sliding plate in the shape of a snow board,
   a front stay having a lower end attached to a front portion of the sliding plate pivotably only in a front and rear direction and which extends in a skewed rear upper direction therefrom,
   a handlebar at an upper end of the front stay,
   a frame stay having a front end pivotably attached at a middle portion of the front stay and which extends in a bifurcated shape rearward and downward in a central position over the sliding plate,
   wherein at each end of the frame stay having the bifurcated shape opposite the front end,
   a frame extension portion is connected, each frame extension portion extending along edges of the sliding plate and fixed thereto,
   a feet supporting plate between the two frame extension portions,
   a supporting stay having a front end pivotably attached to an upper portion of the front stay and which extends rearwardly and downwardly, and a rear end attached pivotably to the feet supporting plate,
   a feet holding belt attached to the frame extension portions or to the feet supporting plate, and
   suspension members provided in an axis of the front stay, the frame stay, and the supporting stay to absorb forces which occur in an axial direction on the stays during bending of the sliding plate.

2. The sliding apparatus according to claim 1, wherein the front stay constitutes an angle of 60 to 80° with the sliding plate.

3. The sliding apparatus according to claim 1 or 2, wherein rear ends of the frame extension portions are connected with an arcuate connection portion projecting in a skewed upper direction from the sliding plate.

* * * * *